US012699409B2

(12) United States Patent
Yuan et al.

(10) Patent No.: US 12,699,409 B2
(45) Date of Patent: Aug. 4, 2026

(54) OIL INJECTED AIR COMPRESSOR AND METHOD FOR CONTROLLING THE SAME, AND STORAGE MEDIUM AND ELECTRONIC DEVICE

(71) Applicant: FUSHENG Industrial (Shanghai) Co., Ltd., Shanghai (CN)

(72) Inventors: Zhen Yuan, Shanghai (CN); Yue Yu, Shanghai (CN); Yi-Chao Huang, Shanghai (CN)

(73) Assignee: FUSHENG Industrial (Shanghai) Co., Ltd., Shanghai (CN)

( * ) Notice: Subject to any disclaimer, the term of this patent is extended or adjusted under 35 U.S.C. 154(b) by 326 days.

(21) Appl. No.: 18/628,074

(22) Filed: Apr. 5, 2024

(65) Prior Publication Data

US 2024/0353878 A1      Oct. 24, 2024

(30) Foreign Application Priority Data

Apr. 19, 2023    (CN) .......................... 202310423657.8

(51) Int. Cl.
| | |
|---|---|
| *F04B 39/02* | (2006.01) |
| *F04B 39/06* | (2006.01) |
| *G05D 23/19* | (2006.01) |

(52) U.S. Cl.
CPC ......... *G05D 23/1917* (2013.01); *F04B 39/02* (2013.01); *F04B 39/06* (2013.01)

(58) Field of Classification Search
CPC ...... F04B 39/062; F04B 39/066; F04B 39/02; F04B 39/06; F04B 49/06; G05D 23/1917
USPC ................... 55/467.3; 96/155, 156, 173, 174
See application file for complete search history.

(56) References Cited

U.S. PATENT DOCUMENTS

| | | | |
|---|---|---|---|
| 11,047,390 | B2 | 6/2021 | Kotani |
| 2011/0107790 | A1* | 5/2011 | Dunn ...................... F04B 39/06 |
| | | | 62/507 |
| 2017/0024651 | A1* | 1/2017 | Mishra ............... G06Q 30/0201 |
| 2018/0017062 | A1* | 1/2018 | Peters ..................... F04B 39/16 |

(Continued)

FOREIGN PATENT DOCUMENTS

| | | |
|---|---|---|
| CN | 101398004 A | 4/2009 |
| CN | 110185613 A | 8/2019 |

(Continued)

OTHER PUBLICATIONS

1 Extended European Search Report mailed on Sep. 19, 2024 in EP 24169270.4.

*Primary Examiner* — Frank M Lawrence, Jr.
(74) *Attorney, Agent, or Firm* — Fox Rothschild LLP

(57)      ABSTRACT

The present disclosure provides an oil injected air compressor and a method for controlling the same, a storage medium, and an electronic device. The oil injected air compressor includes a compressor assembly, an oil separator tank, an oil cooler assembly, an after cooler assembly, and a controller. The oil cooler assembly is connected to the compressor assembly and the oil separator tank, and is configured to cool the oil. The after cooler assembly is connected to the oil separator tank, and is configured to cool compressed air separated from the oil separator tank. The controller is configured to control, based on a state switching signal, the oil cooler assembly to operate in an energy-saving state, and the after cooler assembly to operate in a shutdown state or in a minimum speed state.

20 Claims, 13 Drawing Sheets

(56)  References Cited

U.S. PATENT DOCUMENTS

| | | | |
|---|---|---|---|
| 2023/0332589 A1* | 10/2023 | Yamamoto | F04C 29/04 |
| 2025/0067266 A1* | 2/2025 | Vandevoorde | F04B 39/062 |
| 2025/0180019 A1* | 6/2025 | Matsuzaka | F04B 39/066 |

FOREIGN PATENT DOCUMENTS

| | | |
|---|---|---|
| CN | 114688032 A | 7/2022 |
| CN | 217873283 U | 11/2022 |
| EP | 3775560 B1 | 12/2021 |

* cited by examiner

1

OIL INJECTED AIR COMPRESSOR AND METHOD FOR CONTROLLING THE SAME, AND STORAGE MEDIUM AND ELECTRONIC DEVICE

CROSS REFERENCE TO RELATED APPLICATIONS

The present disclosure claims priority to Chinese Patent Application No. 202310423657.8, filed on Apr. 19, 2023 and entitled "OIL INJECTED AIR COMPRESSOR AND METHOD FOR CONTROLLING THE SAME, AND STORAGE MEDIUM AND ELECTRONIC DEVICE", the entire contents of which are incorporated herein by reference for all purposes.

TECHNICAL FIELD

The present disclosure relates to the field of air compressor technology, in particular to an oil injected air compressor and a method for controlling the same, and a storage medium and an electronic device.

BACKGROUND

The air compressing machine (abbreviated as "air compressor") is a device used to compress air. The air compressor can provide compressed air to a user end for use.

SUMMARY

The oil injected air compressor provided by the present disclosure includes a compressor assembly, an oil separator tank, an oil cooler assembly, an after cooler assembly, and a controller. The compressor assembly is configured to compress air. The oil separator tank is connected to the compressor assembly and configured to separate an oil and air mixture provided by the compressor assembly. Oil circulates between the compressor assembly and the oil separator tank. The oil cooler assembly is connected to the compressor assembly and the oil separator tank, and is configured to cool the oil. The after cooler assembly is connected to the oil separator tank, and is configured to cool compressed air separated from the oil separator tank. The controller is connected to the compressor assembly, the oil separator tank, the oil cooler assembly, and the after cooler assembly via signals, and is configured to control, based on a state switching signal, the oil cooler assembly to operate in an energy-saving state, and the after cooler assembly to operate in a shutdown state or in a minimum speed state. The state switching signal is configured to indicate switching of the oil injected air compressor from a heavy loading state to an empty loading state.

The method for controlling the oil injected air compressor provided by the present disclosure includes: obtaining a state switching signal, wherein the state switching signal is configured to indicate switching of the oil injected air compressor from a heavy loading state to an empty loading state; and controlling, based on the state switching signal, an oil cooler assembly to operate in an energy-saving state, and an after cooler assembly to operate in a shutdown state or in a minimum speed state.

The computer-readable storage medium provided by the present disclosure stores a computer program, which when executed by a processor, causes the method described above to be implemented.

The electronic device provided by the present disclosure includes: one or more processors and a storage device for storing one or more programs, and when the one or more programs are executed by the one or more processors, the one or more processors are caused to implement the method described above.

EXPLANATIONS OF REFERENCE NUMERALS ARE AS FOLLOWS

Figure 1:
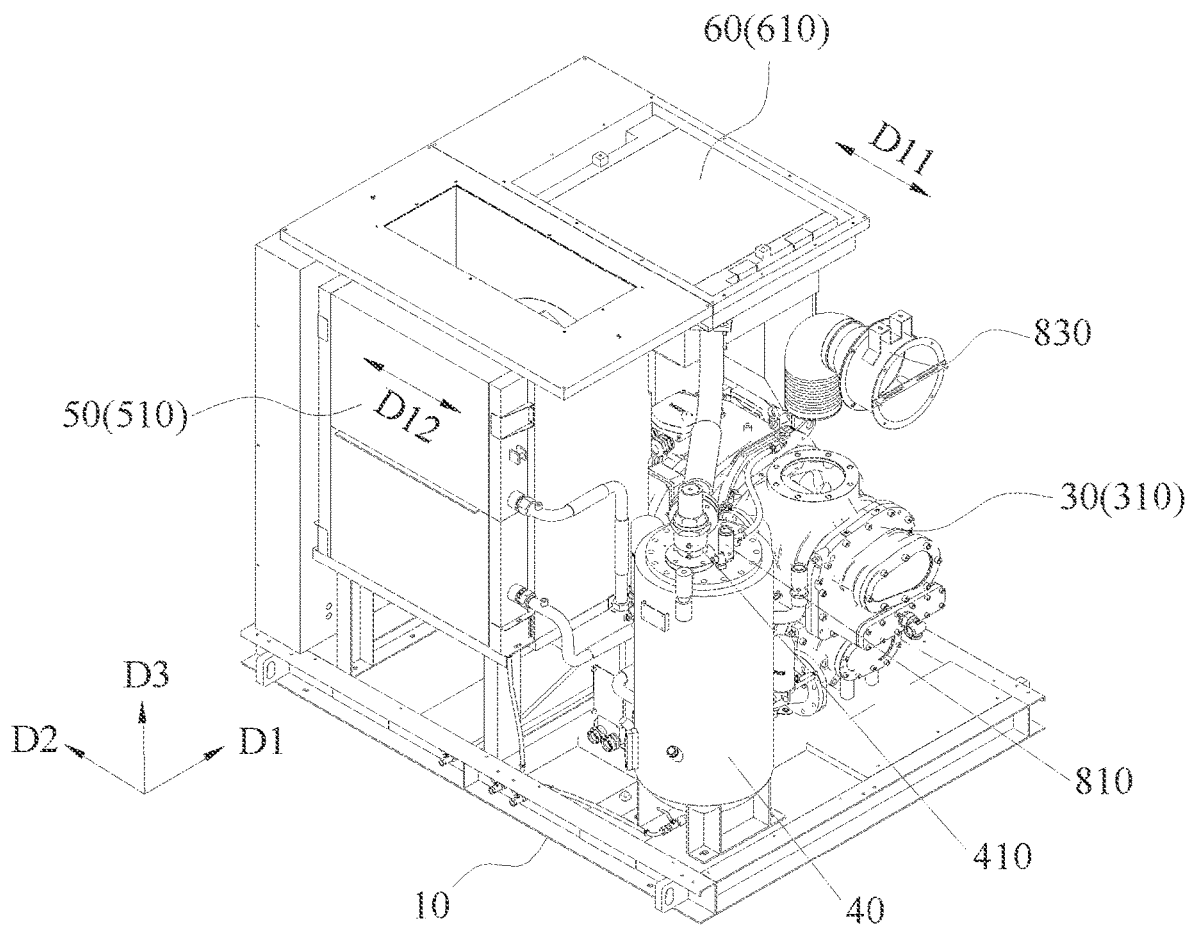
FIG. 1 illustrates a schematic three-dimensional diagram of an oil injected air compressor according to embodiments of the present disclosure, with an outer cover omitted.
Figure 2:
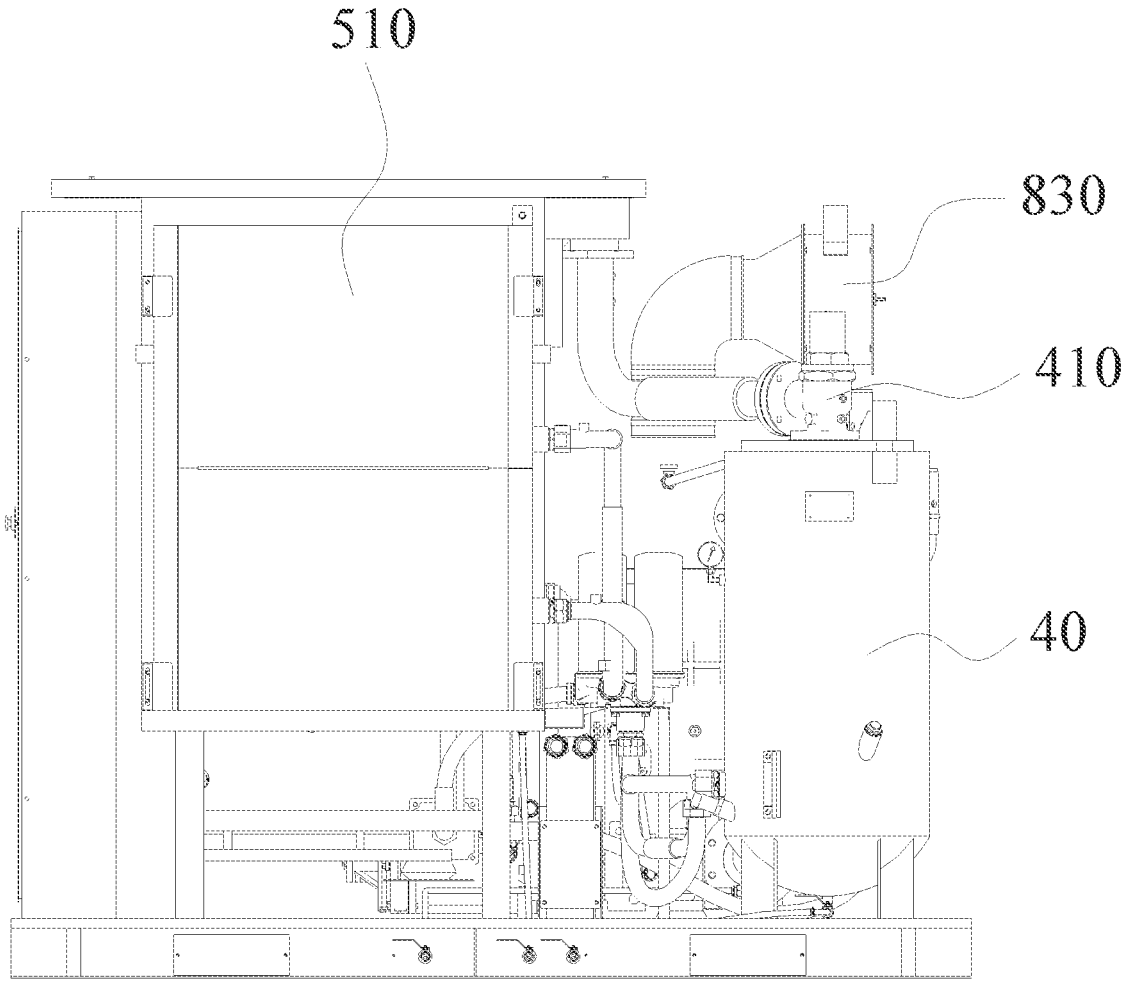
FIG. 2 illustrates a schematic front view of FIG. 1.

10. Base; 20. Outer cover; 210. Top wall; 211. First air outlet; 212. Second air outlet; 220. First side wall; 221. First air inlet; 230. Second side wall; 231. Second air inlet; 240. Third side wall; 250. Fourth side wall; 30. Compressor assembly; 310. Compressor body; 320. Main motor; 330. Oil temperature sensor; 40. Oil separator tank; 410. Pressure retaining valve; 50. Oil cooler assembly; 510. Oil cooling heat exchanger; 520. Oil cooling fan; 530. Oil cooling motor; 540. Oil cooling pipeline; 60. After cooler assembly; 610. Post cooling heat exchanger; 620. Post cooling fan; 630. Post cooling motor; 640. Compressed air temperature sensor; 70. Controller; 810. Safety valve; 820. Startup disk; 830. Intake filter; 840. Frequency converter; 850. Intake valve; 860. Release valve; 870. Flow regulating valve; 880. Oil filter; 891. Pressure sensor; 892. Temperature sensor; 90. Oil fine separator; P1. Oil flow path; P2. Air flow path; D1. Left and right direction; D2. Front and rear direction; D3. Up and Down direction; D11. First direction; D12. Second direction.

DETAILED DESCRIPTION

Example embodiments will now be described more fully with reference to the drawings. Example embodiments, however, can be embodied in a variety of forms and should not be construed as being limited to examples set forth herein. Instead, these embodiments are provided so that the present disclosure will be thorough and complete, and will fully convey concepts of the example embodiments to those skilled in the art. The same reference numerals in the drawings represent the same or similar structures, and thus their detailed descriptions will be omitted.

As shown in FIGS. 1 to 7, an oil injected air compressor provided by embodiments of the present disclosure includes a base 10, an outer cover 20, a compressor assembly 30, an oil separator tank 40, an oil cooler assembly 50, an after cooler assembly 60, and a controller 70. The compressor assembly 30 is used to compress air, and the oil separator tank 40 is connected to the compressor assembly 30 for separating an oil and air mixture provided by the compressor assembly 30. Oil circulates and flows between the compressor assembly 30 and the oil separator tank 40. The oil cooler assembly 50 is connected to the compressor assembly 30 and the oil separator tank 40 for cooling the oil. The after cooler assembly 60 is connected to the oil separator tank 40 for cooling compressed air separated from the oil separator tank 40. The controller 70 is connected to the compressor assembly 30, the oil separator tank 40, the oil cooler assembly 50, and the after cooler assembly 60 via signals, and configured to control the oil cooler assembly 50 to operate in an energy-saving state and the after cooler assembly 60 to operate in a shutdown state or a minimum speed state, based on a state switching signal. In some embodiments, the state switching signal is a signal indicating switching of the oil injected air compressor from a heavy loading state to an empty loading state.

It can be understood that terms "include" and "have" and any variations thereof in embodiments of the present disclosure are intended to cover non-exclusive inclusions. For example, processes, methods, systems, products, or devices that include a series of steps or units are not limited to the steps or units listed, but optionally include steps or units that are not listed, or alternatively include other steps or components that are inherent to these processes, methods, products, or devices.

In some embodiments, the oil cooler assembly 50 is connected to the compressor assembly 30 and the oil separator tank 40, for cooling the oil circulating and flowing between the compressor assembly 30 and the oil separator tank 40. The after cooler assembly 60 is connected to the oil separator tank 40, for cooling the compressed air separated from the oil separator tank 40. The oil cooler assembly 50 and the after cooler assembly 60 are independently arranged, so that the cooling between an oil path and an air path will not influence each other, thereby further ensuring the cooling effect on the oil and the compressed air.

In addition, due to the independent arrangement of the oil cooler assembly 50 and the after cooler assembly 60, and their respective signal connections with the controller 70, controller 70 can respectively control operation states of the oil cooler assembly 50 and the after cooler assembly 60 according to a state of the air compressor, achieving more flexible operations. In some embodiments, the controller 70 can control the oil cooler assembly 50 to operate in an energy-saving state based on a signal of the air compressor switching from a heavy loading state to an empty loading state, and control the after cooler assembly 60 to operate in a shutdown state or in a minimum speed state. Since the air compressor does not need to provide compressed air to the outside in an empty loading state, the after cooler assembly 60 can operate in a shutdown state or in a minimum speed state. While in the empty loading state, in order to ensure the normal operation of the air compressor, there is still oil circulating and flowing between the compressor assembly 30 and the oil separator tank 40, and thus the oil cooler assembly 50 needs to operate in an energy-saving state to cool the oil. In this way, by controlling the oil cooler assembly 50 to operate in an energy-saving state, and the after cooler assembly 60 to operate in a shutdown state or in a minimum speed state through the controller 70, the normal operation of the air compressor can be ensured, as well as the energy consumption can be reduced. In some embodiments, the minimum speed state can also be referred to as the lowest frequency state, which has a speed lower than a highest speed of the post cooling motor 630 and can reach a minimum speed of 40% of the highest speed.

Reference is made to FIGS. 7 to 11, the outer cover 20 is arranged on the base 10, and the outer cover 20 and the base 10 jointly form an accommodation space. The compressor assembly 30, the oil separator tank 40, the oil cooler assembly 50, the after cooler assembly 60, and the controller 70 are all arranged in the accommodation space formed by the outer cover 20 and the base 10, and are covered by the outer cover 20.

The outer cover 20 includes a top wall 210, a first side wall 220, a second side wall 230, a third side wall 240, and a fourth side wall 250. The first side wall 220 and the second side wall 230 are arranged relative to each other along the left and right direction D1 (the direction indicated by an arrow is left, and the reverse direction is right), and the first side wall 220 and the second side wall 230 are respectively connected to two opposite sides of the base 10. The third side wall 240 and the fourth side wall 250 are arranged relative to each other along the front and rear direction D2 (the direction indicated by an arrow is front, and the reverse direction is rear), and the third side wall 240 and the fourth side wall 250 are respectively connected to the other two opposite sides of the base 10. Moreover, the third side wall 240 is connected to the first side wall 220 and the second side wall 230, and the fourth side wall 250 is connected to the first side wall 220 and the second side wall 230. The top wall 210 and the base 10 are arranged relative to each other along the up and down direction D3 (the direction indicated by an arrow is up, and the reverse direction is down), and the top wall 210 is connected to the first side wall 220, the second side wall 230, the third side wall 240, and the fourth side wall 250, respectively.

The controller 70 is connected to the compressor assembly 30, the oil separator tank 40, the oil cooler assembly 50, and the after cooler assembly 60 via signals, and is configured to control the operations of the compressor assembly 30, the oil separator tank 40, the oil cooler assembly 50, and the after cooler assembly 60, respectively.

It can be understood that the term "connected . . . via signals" can be the wired or wireless connection, and the wireless connection can include wifi connection, Bluetooth connection, etc.

Figure 4:
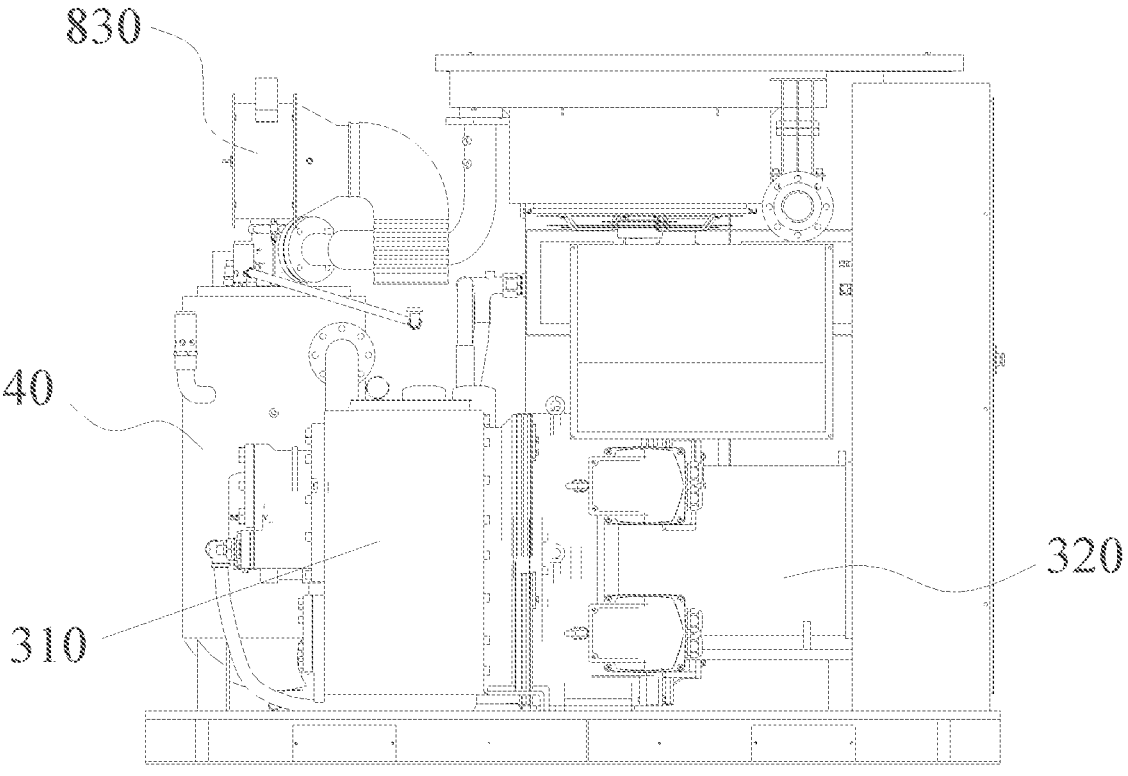
FIG. 4 illustrates a schematic rear view of FIG. 1.

As shown in FIG. 4, the compressor assembly 30 can include a compressor body 310 and a main motor 320. The main motor 320 is connected to the compressor body 310 and is configured to drive the compressor body 310. The main motor 320 is connected to the controller 70 via signals.

It can be understood that the compressor body 310 can be a screw compressor. The oil circulating and flowing between the compressor assembly 30 and the oil separator tank 40 is used to seal, cool, and lubricate the screw compressor.

Figure 3:
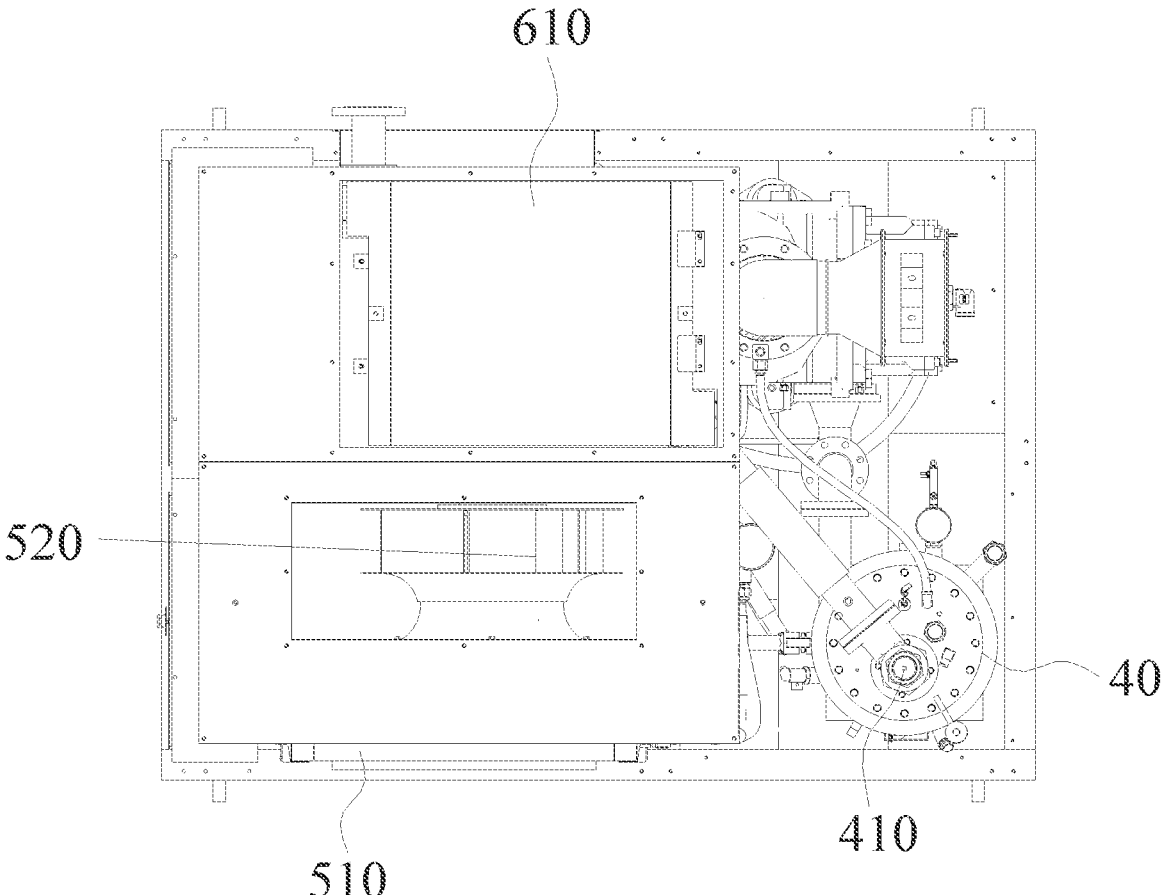
FIG. 3 illustrates a schematic top view of FIG. 1.
Figure 5:
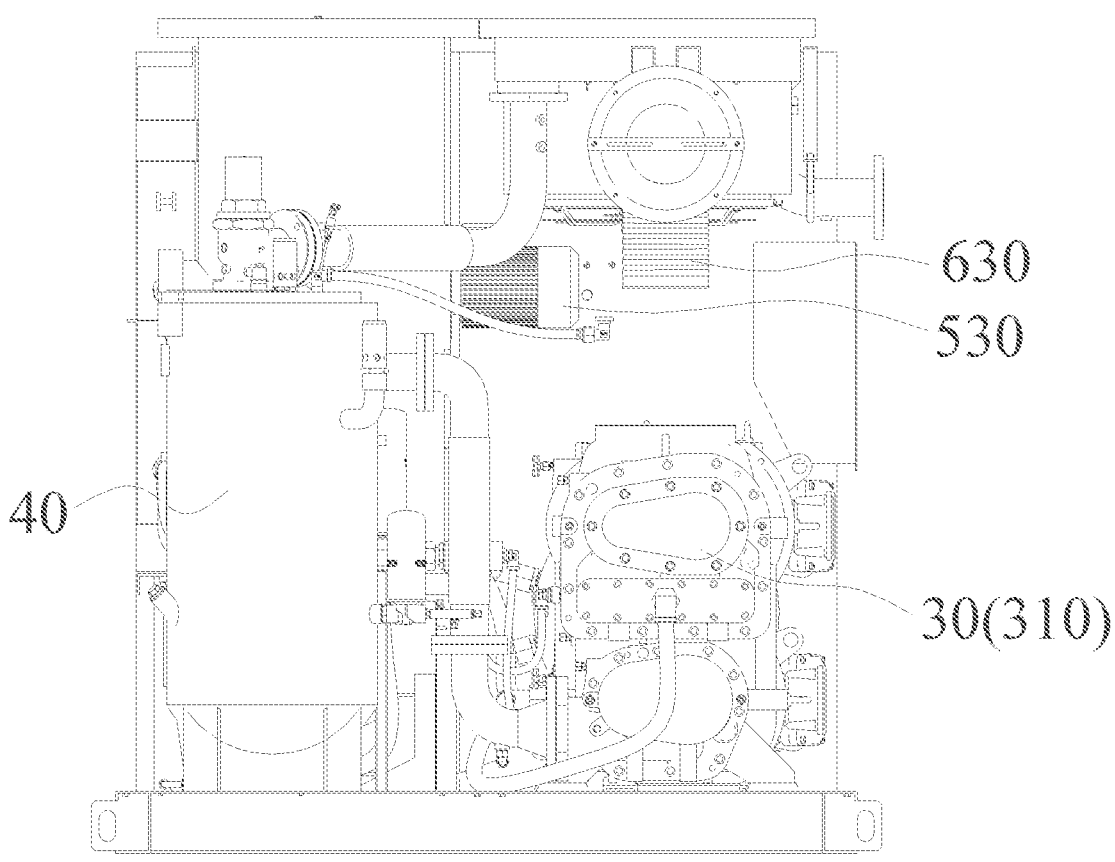
FIG. 5 illustrates a schematic right side view of FIG. 1.
Figure 6:
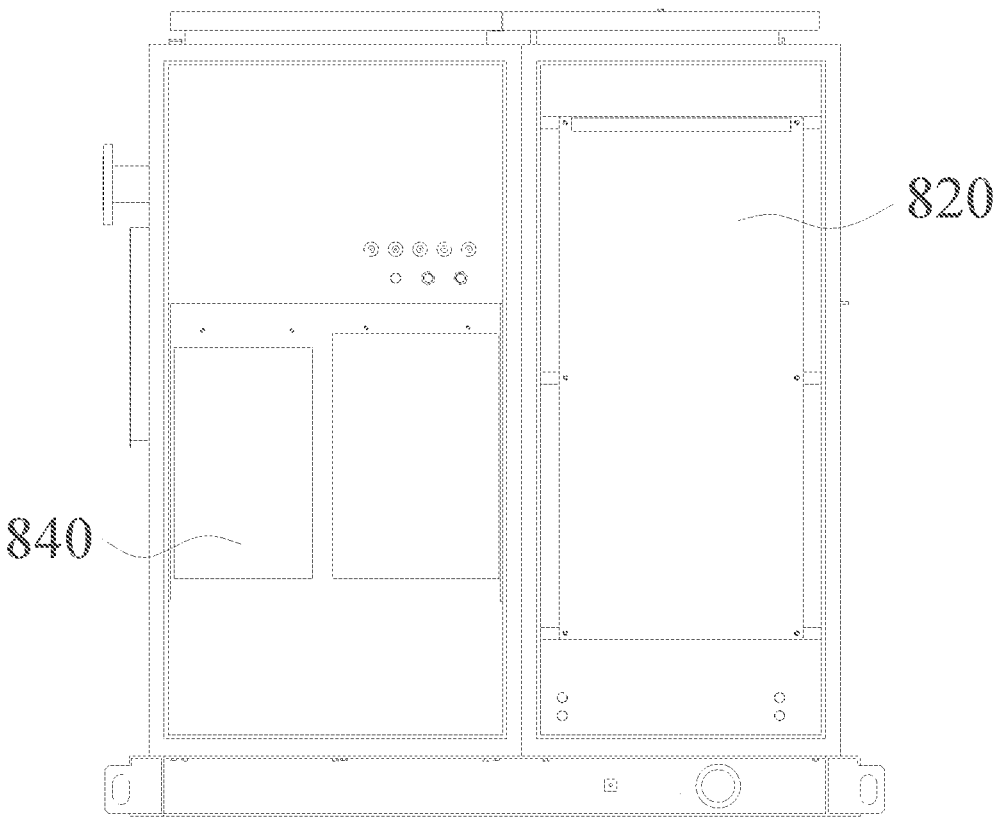
FIG. 6 illustrates a schematic left side view of FIG. 1.
Figure 7:
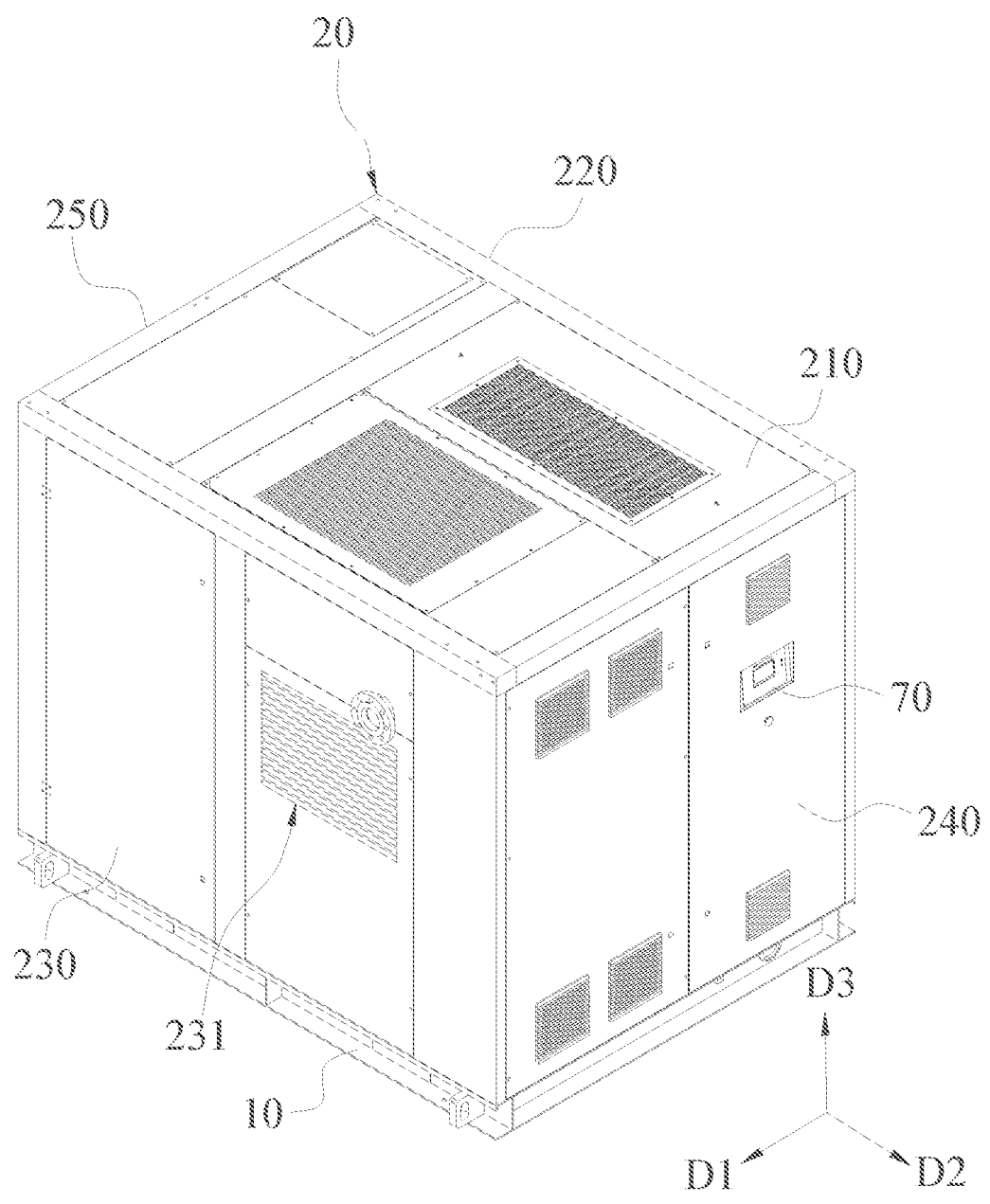
FIG. 7 illustrates a schematic three-dimensional diagram of an oil injected air compressor with an outer cover according to embodiments of the present disclosure.
Figure 8:
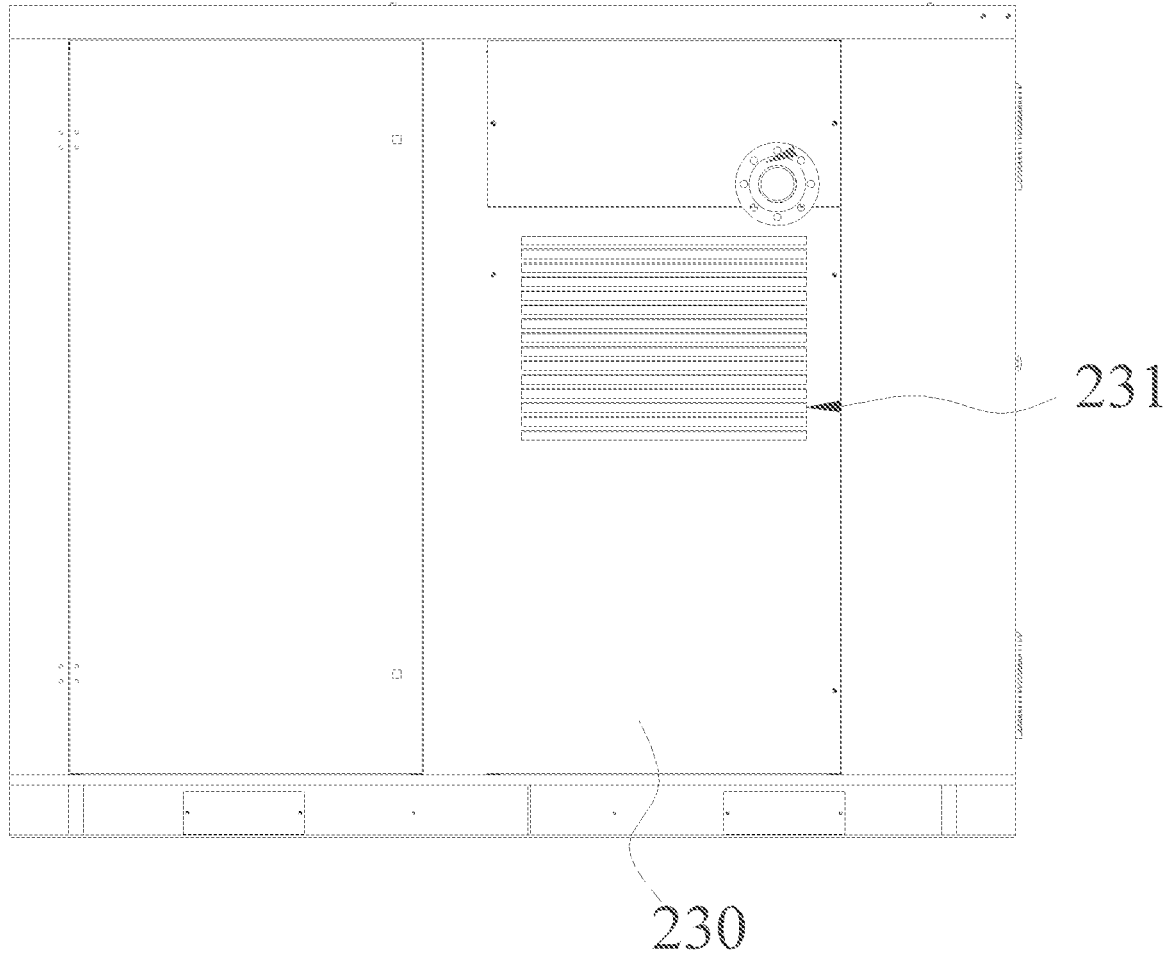
FIG. 8 illustrates a schematic front view of FIG. 7.
Figure 9:
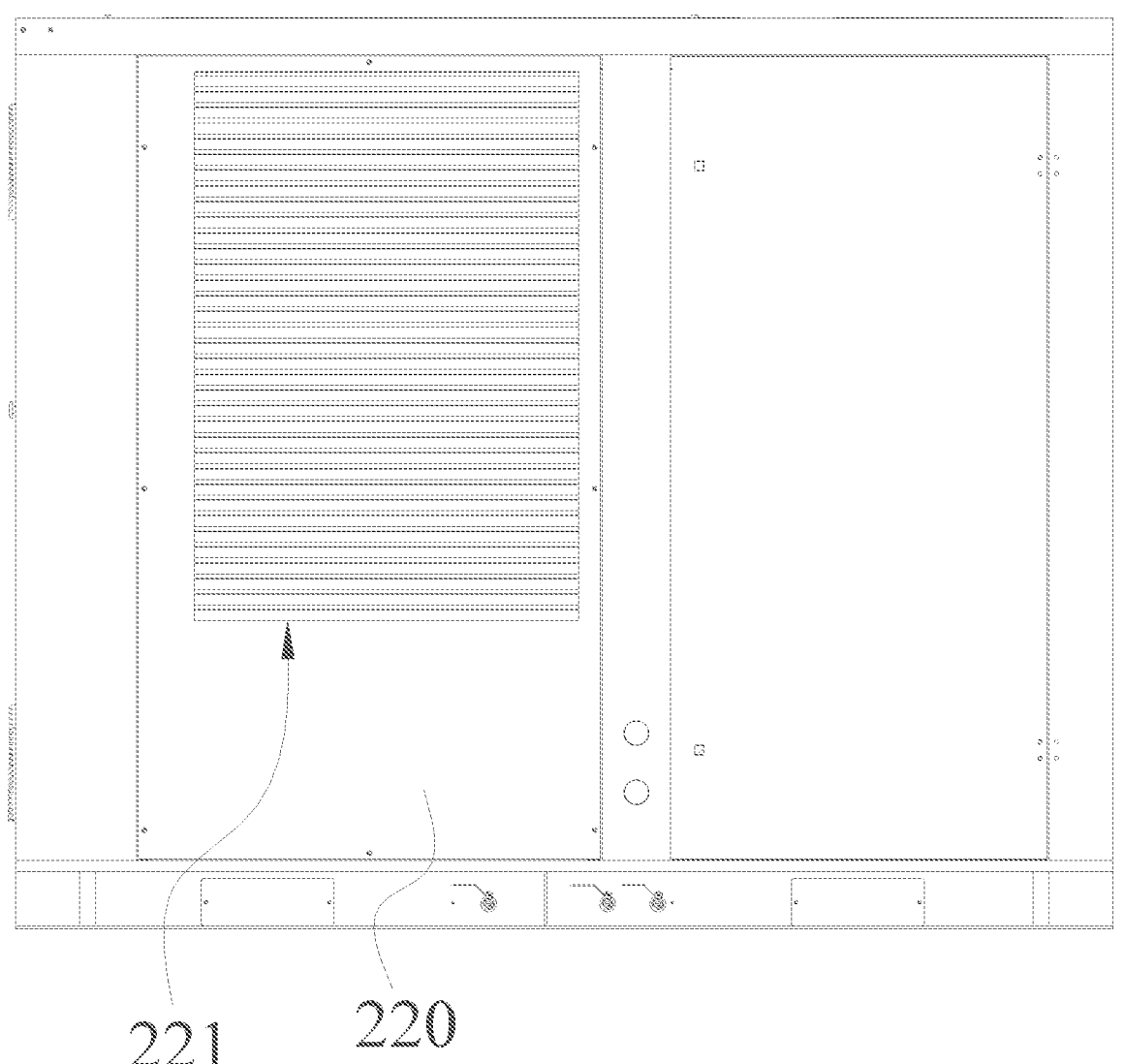
FIG. 9 illustrates a schematic rear view of FIG. 7.
Figure 10:
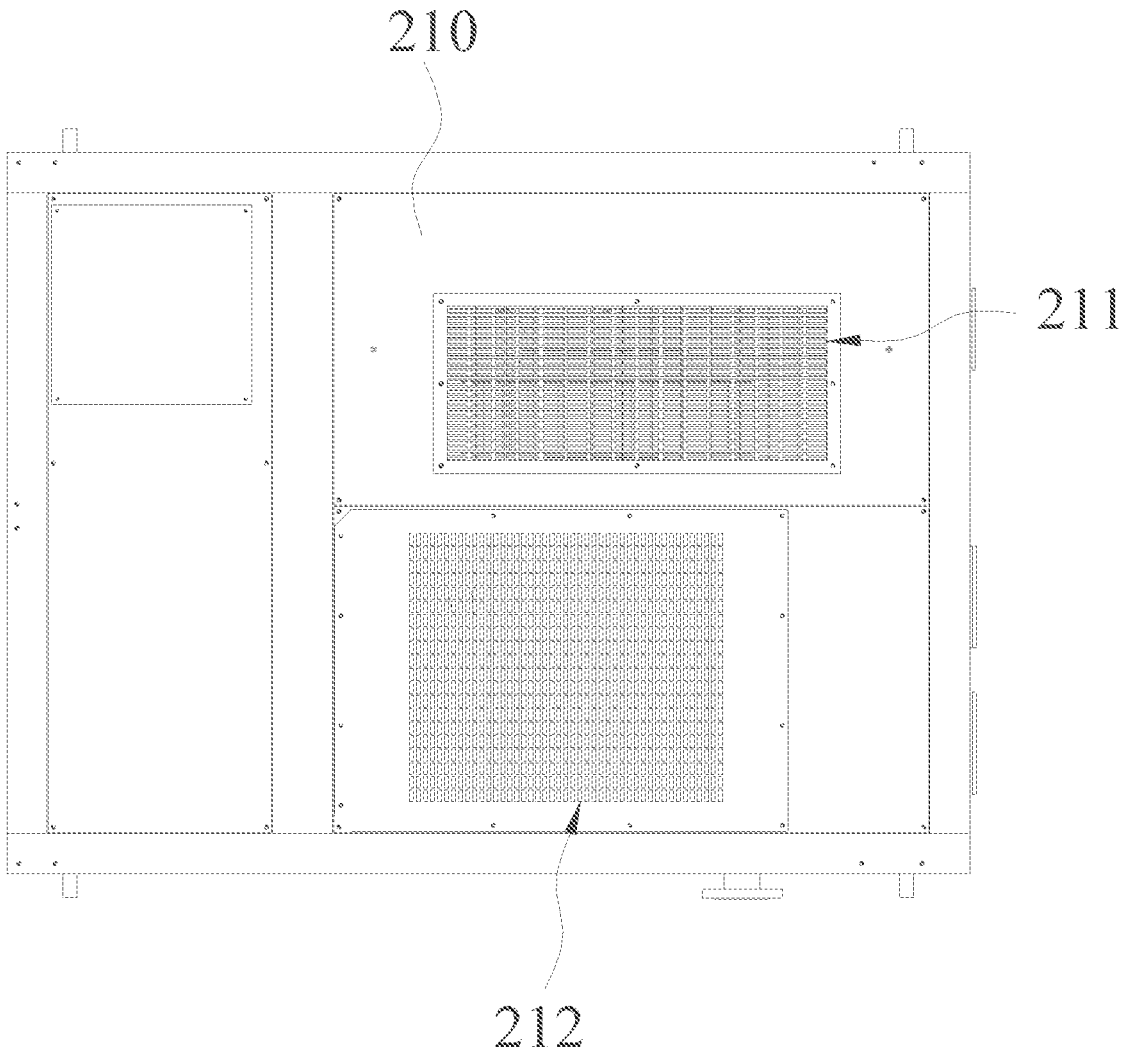
FIG. 10 illustrates a schematic top view of FIG. 7.
Figure 11:
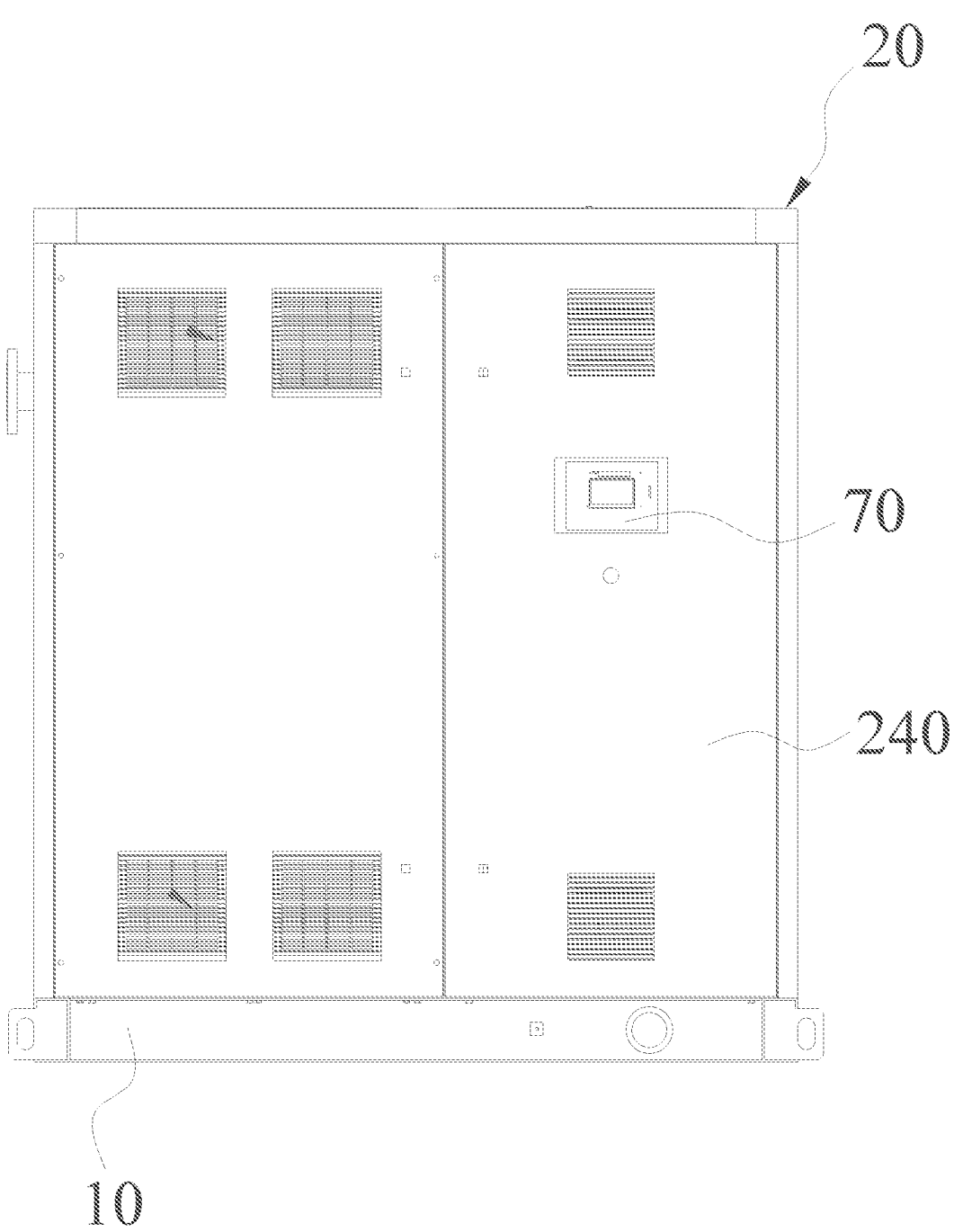
FIG. 11 illustrates a schematic right side view of FIG. 7.

As shown in FIGS. 1, 3, and 5, the oil cooler assembly 50 includes an oil cooling heat exchanger 510, an oil cooling fan 520, and an oil cooling motor 530. The oil cooling heat exchanger 510 is connected to the compressor assembly 30 and the oil separator tank 40, for exchanging heat with the oil. The oil cooling fan 520 is arranged on one side of the oil cooling heat exchanger 510, for discharging the heat generated by the oil cooling heat exchanger 510. The oil cooling motor 530 is a variable frequency motor, and the oil cooling motor 530 is connected to the oil cooling fan 520, and configured to drive the oil cooling fan 520. The controller 70 is connected to the oil cooling motor 530 via signals, and is configured to control the oil cooling motor 530 to operate in a low frequency state based on the state switching signal.

It can be understood that the oil cooling heat exchanger 510 is connected to the compressor body 310 and the oil separator tank 40 through pipelines, respectively. The oil can circulate and flow between the oil cooling heat exchanger 510, the compressor body 310, and the oil separator tank 40 through the pipelines.

The oil cooling motor 530 can drive the oil cooling fan 520 to rotate. Through the action of the oil cooling fan 520, cold air can pass through the oil cooling heat exchanger 510 to achieve heat exchange between the oil and the cold air inside the oil cooling heat exchanger 510, ultimately achieving the purpose of cooling the oil.

When the air compressor is in different operation states, the controller 70 controls the oil cooling motor 530 to be in different states. In some embodiments, when the air compressor is in the heavy loading state, the controller 70 controls the oil cooling motor 530 to operate in a rated frequency state, and at the moment, the motor has a high speed, which improves the cooling effect. When the air compressor switches from the heavy loading state to the empty loading state, the controller 70 controls the oil cooling motor 530 to operate in a low frequency state, and at the moment, the motor has a low speed, which saves energy while ensuring a certain cooling effect.

In some embodiments, when the air compressor switches from the heavy loading state to the empty loading state, the controller 70 controls the oil cooling motor 530 to operate in the lowest frequency state, to maximize the energy savings.

As shown in FIGS. 1, 3, and 5, the after cooler assembly 60 includes a post cooling heat exchanger 610, a post cooling fan (not shown in the drawing), and a post cooling motor 630. The post cooling heat exchanger 610 is connected to the oil separator tank 40 for exchanging heat with the compressed air separated from the oil separator tank 40. The post cooling fan is arranged on one side of the post cooling heat exchanger 610, for discharging the heat generated by the post cooling heat exchanger 610. The post cooling motor 630 can be a variable frequency motor or a fixed frequency motor, and the post cooling motor 630 is connected to the post cooling fan and configured to drive the post cooling fan. The controller 70 is connected to the post cooling motor 630 via signals, and is configured to control the post cooling motor 630 to operate in a shutdown state or a minimum speed state, based on a state switching signal. In some embodiments, the minimum speed state can also be referred to as the lowest frequency state, which has a speed lower than the highest speed of the post cooling motor 630 and can reach a minimum of 40% of the highest speed.

It can be understood that the post cooling heat exchanger 610 is connected to the oil separator tank 40 through a pipeline, so that the compressed air separated from the oil separator tank 40 can flow to the post cooling heat exchanger 610 for heat exchange through the pipeline. In some embodiments, a pressure retaining valve 410 is provided on a top of the oil separator tank 40, and the post cooling heat exchanger 610 is connected to the pressure retaining valve 410 through a pipeline. The pressure retaining valve 410 is used to retain the pressure of the compressed air flowing out of the oil separator tank 40.

The post cooling motor 630 can drive the post cooling fan to rotate. Through the action of the post cooling fan, cold air can pass through the post cooling heat exchanger 610 to achieve heat exchange between the compressed air and the cold air inside the post cooling heat exchanger 610, and thus achieving the purpose of cooling the compressed air.

The controller 70 can independently control the startup and shutdown of the oil cooling motor 530 and the post cooling motor 630. Therefore, when the air compressor is in the empty loading state, since the air compressor does not need to provide compressed air to the outside, the controller 70 can control the post cooling motor 630 to shut down, which will also not affect the oil cooling motor 530 to operate in the lowest frequency state.

The oil injected air compressor in embodiments of the present disclosure further includes a safety valve 810, a startup disk 820, and an intake filter 830. In some embodiments, the safety valve 810 is arranged on the oil separator tank 40 to ensure the safety of the oil separator tank 40. The startup disk 820 is used to collect, process, and transmit the operation state information of the oil injected air compressor, and achieve control and protection based on the operation state information collected. The intake filter 830 is arranged on the compressor body 310 to filter the air sucked into the compressor body 310 and prevent foreign objects from entering the compressor body 310.

In some embodiments, the oil injected air compressor of the present disclosure further includes a frequency converter 840, which is coordinated with the main motor 320 to adjust the frequency based on the signal provided by the controller 70, thereby achieving the frequency conversion function of the main motor 320.

As shown in FIGS. 1 and 4, the compressor assembly 30 is arranged on base 10, the after cooler assembly 60 is arranged above the compressor assembly 30, and the after cooler assembly 60 is arranged on an inner wall surface close to the top wall 210. The after cooler assembly 60 can be arranged at any position on the top wall 210. In some embodiments, the after cooler assembly 60 is arranged directly above the compressor assembly 30. By arranging the after cooler assembly 60 above the compressor assembly 30, the space utilization rate along the up and down direction D3 inside the air compressor can be improved.

The oil cooler assembly 50 and the after cooler assembly 60 are arranged on different walls of the outer cover 20. In embodiments of the present disclosure, the oil cooler assembly 50 and the after cooler assembly 60 are arranged on any two different side walls among the first side wall 220, the second side wall 230, the third side wall 240, the fourth side wall 250, and the top wall 210 of the outer cover 20. At the same time, the oil cooler assembly 50 and the after cooler assembly 60 are not arranged on the same wall as electrical controlling components (such as the controller 70, the startup disk 820, the frequency converter 840, etc.). In other words, the oil cooler assembly 50, the after cooler assembly 60, and the electrical controlling components are arranged on three different walls of the outer cover 20. In embodiments of the present disclosure, the oil cooler assembly 50 is arranged on an inner surface of the first side wall 220, and the after cooler assembly 60 is arranged on an inner surface of the second side wall 230. That is, the oil cooler assembly 50 and the after cooler assembly 60 are arranged relative to each other along the left and right direction D1, and the oil cooler assembly 50 is arranged on a right side inside the air compressor, while the after cooler assembly 60 is arranged on a left side inside the air compressor.

In some embodiments, when the after cooler assembly 60 is arranged on the top wall 210 of the outer cover 20 and located adjacent to four edges of the top wall 210, the after cooler assembly 60 can be arranged simultaneously on the inner surface(s) of any one or two side walls among the first side wall 220, the second side wall 230, the third side wall 240, and the fourth side wall 250. In addition, the after cooler assembly 60 can also be arranged only on the inner surface(s) of any one or two side walls among the first side wall 220, the second side wall 230, the third side wall 240, and the fourth side wall 250 of the outer cover 20, at a specific distance from the top wall 210.

It can be understood that in some embodiments, the oil cooler assembly 50 can also be arranged on any side wall among the second side wall 230, the third side wall 240, and the fourth side wall 250.

The compressor assembly 30 is arranged close to the inner surface of the second side wall 230, and the compressor assembly 30 and the oil cooler assembly 50 are arranged opposite to each other along the left and right direction D1 (i.e. a direction along which the first side wall 220 and the second side wall 230 are spaced). The main motor 320 is connected to the compressor body 310 along a first direction D11, and the oil cooler assembly 50 extends along a second direction D12. The first direction D11 is parallel to the second direction D12.

As shown in FIG. 1, the after cooler assembly 60 is arranged above the compressor assembly 30 along the up and down direction D3, and both the after cooler assembly 60 and the compressor assembly 30 are arranged on a left side inside the air compressor. The oil cooler assembly 50 and the after cooler assembly 60 are arranged opposite to each other along the left and right direction D1, and the oil cooler assembly 50 is arranged on a right side inside the air compressor. The oil separator tank 40 and the oil cooler assembly 50 are arranged opposite to each other along the front and rear direction D2, and the oil cooler assembly 50 is located on a front side inside the air compressor, while the oil separator tank 40 is located on a rear side inside the air compressor. Such arrangement layout can effectively improve the space utilization rate inside the air compressor, which is conducive to reducing the volume of the air compressor.

As shown in FIGS. 7 to 11, the first side wall 220 is provided with a first air inlet 221, which corresponds to a location of the oil cooler assembly 50. The second side wall 230 is provided with a second air inlet 231, which corresponds to a location of the after cooler assembly 60. The top wall 210 is provided with a first air outlet 211 and a second air outlet 212, the first air outlet 211 corresponds to the location of the oil cooler assembly 50, and the second air outlet 212 corresponds to the location of the after cooler assembly 60.

In some embodiments, a cooling channel formed after the assembly of the oil cooler assembly 50 and the outer cover 20 is as follows: cold air enters from a side wall of the outer cover 20 and is discharged from the top wall of the outer cover 20. In some embodiments of the present disclosure, the cold air used for cooling the oil enters the air compressor through the first air inlet 221 of the outer cover 20, the cold air becomes hot air after the heat exchange by the oil cooler assembly 50, and the hot air is discharged from the first air outlet 211 of the outer cover 20. It can be understood that the direction of the cooling channel of the oil cooler assembly 50 is related to the blowing direction of the oil cooling fan 520.

In some embodiments, a cooling channel formed after the assembly of the after cooler assembly 60 and the outer cover 20 is as follows: cold air enters from a side wall of the outer cover 20 and is discharged from the top wall/side wall of the outer cover 20. In some embodiments of the present disclosure, the cold air used for cooling the compressed air enters the air compressor through the second air inlet 231 of the outer cover 20, and flows across an exterior of the compressor assembly 30. Then the cold air becomes hot air after the heat exchange by the after cooler assembly 60, and the hot air is discharged from the second air outlet 212 of the outer cover 20. It can be understood that the direction of the cooling channel of the after cooler assembly 60 is related to the blowing direction of the post cooling fan.

In some embodiments, the second air outlet 212 can also be formed on the side wall of the outer cover 20 (for example, the second air outlet 212 can be formed on any side wall among the first side wall 220, the third side wall 240, and the fourth side wall 250), and the second air outlet 212 can be located close to the top wall 210 of the outer cover 20. In other words, the second air outlet 212 is formed on the side wall of the outer cover 20 and located close to the top wall 210.

In some embodiments, the cooling channel of the oil cooler assembly 50 can be referred to as side-in top-out, and the cooling channel of the after cooler assembly 60 can be referred to as side-in top-out or side-in side-out (where "side" in the "side-out" means an upper part of the side wall).

Reference is made to FIG. 1, the after cooler assembly 60 and the compressor assembly 30 are arranged opposite to each other along the up and down direction D3, and the after cooler assembly 60 is arranged adjacent to the compressor assembly 30. In some embodiments, the after cooler assembly 60 is located above the compressor assembly 30. In this way, the after cooler assembly 60 can be used to adjust the exhaust temperature of the compressor assembly 30 and to dissipate the heat generated during the operation of the compressor assembly 30.

In some embodiments, the post cooling fan of the after cooler assembly 60 is an axial flow fan, which corresponds to a location of the second air outlet 212. It is conducive to the control of the discharge direction of the heat dissipating air by designing the post cooling fan as an axial flow fan.

As shown in FIG. 1, the oil cooler assembly 50 and the oil separator tank 40 are arranged opposite to each other along the left and right direction D2, and the oil cooler assembly 50 is arranged adjacent to the oil separator tank 40. In this way, the oil cooler assembly 50 can be used to adjust the oil temperature of the oil separator tank 40.

In some embodiments, the oil cooling fan 520 of the oil cooler assembly 50 is a centrifugal fan, which corresponds to a location of the first air outlet 211. By designing the oil cooling fan 520 as a centrifugal fan, the cooling channel of the oil cooler assembly 50 can be formed as side-in top-out, so as to save the space inside the air compressor.

It can be seen that an overall air duct of the oil injected air compressor provided in embodiments of the present disclosure is formed as: cold air side-in+hot air top-out (the air outlet is arranged on the top wall)/hot air side-out (the air outlet is arranged on the upper part of the side wall), so that the overall heat dissipation efficiency of the oil injected air compressor can be improved.

Embodiments of the present disclosure also provide a method for controlling any of the oil injected air compressors described above. The method includes: obtaining a state switching signal, and the state switching signal indicates switching of the oil injected air compressor from a heavy loading state to an empty loading state; controlling, based on the state switching signal, the oil cooler assembly 50 to operate in an energy-saving state, and the after cooler assembly 60 to operate in a shutdown state or a minimum speed state. In some embodiments, the minimum speed state can also be referred to as the lowest frequency state, which has a speed lower than a highest speed of the post cooling motor 630 and can reach a minimum speed of 40% of the highest speed.

It can be understood that the post cooling motor 630 of the after cooler assembly 60 can be a variable frequency motor or a fixed frequency motor. The methods for controlling the oil injected air compressor will be respectively introduced in different cases in the following, when the post cooling motor 630 is a variable frequency motor or when the post cooling motor 630 is a fixed frequency motor.

When both the oil cooling motor 530 and the post cooling motor 630 are variable frequency motors, the method includes following steps.

(A1) a temperature of oil is obtained when the oil injected air compressor is in a heavy loading state. When the temperature of oil is greater than a set temperature of oil, a speed of the oil cooling fan is increased. When the temperature of oil is less than or equal to the set temperature of oil, the speed of the oil cooling fan is reduced. In some embodiments, the set temperature of oil is greater than the dew point temperature, which meets the requirements of safety control. In some embodiments, the temperature of oil is measured by an oil temperature sensor 330 arranged at an exhaust port of the compressor assembly 30.

After obtaining the temperature of oil, the controller 70 adjusts a frequency of the oil cooling motor 530 based on a ratio of the temperature of oil to the set temperature of oil, to adjust the speed of the oil cooling fan 520.

It should be noted that the term "dew point temperature" refers to a temperature at which the air is cooled to saturation at a maintained constant water vapor content in the air and a maintained constant air pressure. In some embodiments of the present disclosure, the controller can calculate the dew point temperature based on the exhaust pressure, the ambient temperature, and the ambient humidity.

Figure 12:
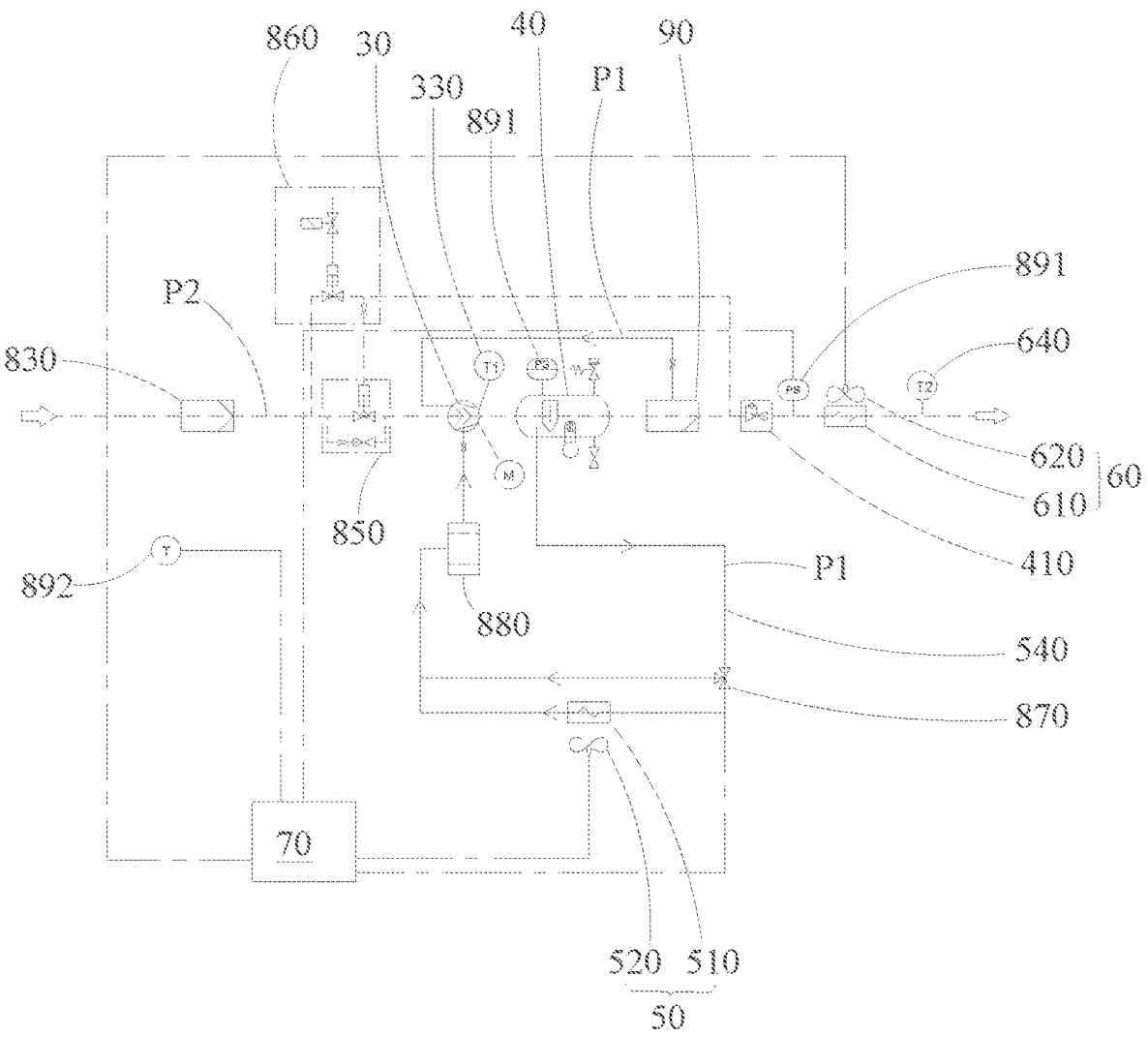
FIG. 12 illustrates a system flowchart of an oil injected air compressor according to embodiments of the present disclosure.

In some embodiments, the dew point temperature is different when the oil injected air compressor is in the heavy loading state and in the empty loading state. The dew point temperature is calculated comprehensively based on the exhaust pressure, the ambient temperature, and the ambient humidity. As shown in FIG. 12, when the oil injected air compressor is in the heavy loading state, the exhaust pressure is measured by a pressure sensor 891 located behind a pressure retaining valve 410 or a pressure sensor located on the oil separator tank 40, and when the oil injected air compressor is in the empty loading state, the exhaust pressure is measured by the pressure sensor located on the oil separator tank 40.

(A2) a temperature of compressed air is obtained when the oil injected air compressor is in a heavy loading state. When the temperature of compressed air is greater than a set temperature of compressed air, a speed of the post cooling fan is increased. When the temperature of compressed air is less than or equal to the set temperature of compressed air, the speed of the post cooling fan is reduced.

In some embodiments, after obtaining the temperature of compressed air, the controller 70 adjusts a frequency of the post cooling motor 630 based on a ratio of the temperature of compressed air to the set temperature of compressed air, to adjust the speed of the post cooling fan. In some embodiments, the temperature of compressed air is measured by a compressed air temperature sensor 640 arranged between the after cooler assembly 60 and an exhaust port of the oil injected air compressor system.

(B1) a temperature of oil is obtained when the oil injected air compressor is in an empty loading state. When the temperature of oil is greater than the set temperature of oil, the speed of the oil cooling fan is increased. When the temperature of oil is less than or equal to the set temperature of oil, the speed of the oil cooling fan is reduced.

(B2) when the oil injected air compressor is in the empty loading state, the post cooling motor 630 is controlled to shut down or to operate in the minimum speed state (the lowest frequency state, which has a speed lower than a highest speed of the post cooling motor 630 and can reach a minimum speed of 40% of the highest speed).

When the oil cooling motor 530 is a variable frequency motor and the post cooling motor 630 is a fixed frequency motor, the method includes following steps.

(A1) a temperature of oil is obtained when the oil injected air compressor is in a heavy loading state. When the temperature of oil is greater than the set temperature of oil, a speed of the oil cooling fan is increased. When the temperature of oil is less than or equal to the set temperature of oil, the speed of the oil cooling fan is reduced. In some embodiments, the temperature of oil is measured by an oil temperature sensor 330 arranged at an exhaust port of the compressor assembly 30.

(A2) a temperature of compressed air is obtained when the oil injected air compressor is in a heavy loading state. When the temperature of compressed air is greater than the set temperature of compressed air, the post cooling fan is controlled to start up. When the temperature of compressed air is less than or equal to the set temperature of compressed air, the post cooling fan is controlled to shut down.

In some embodiments, after obtaining the temperature of compressed air, the controller 70 selectively controls the startup and the shutdown of the post cooling motor 630 based on a ratio of the temperature of compressed air to the set temperature of compressed air, to control the startup and the shutdown of the post cooling fan. In some embodiments, the temperature of compressed air is measured by a compressed air temperature sensor 640 arranged between the after cooler assembly 60 and an exhaust port of the oil injected air compressor system.

(B1) a temperature of oil is obtained when the oil injected air compressor is in an empty loading state. When the temperature of oil is greater than the set temperature of oil, the speed of the oil cooling fan is increased. When the temperature of oil is less than or equal to the set temperature of oil, the speed of the oil cooling fan is reduced.

(B2) when the oil injected air compressor is in the empty loading state, the post cooling motor 630 is controlled to shut down.

The oil injected air compressor in embodiments of the present disclosure has an oil cooler assembly connected to the compressor assembly and the oil separator tank, to cool the oil circulating between the compressor assembly and the oil separator tank. The after cooler assembly is connected to the oil separator tank to cool the compressed air separated from the oil separator tank. Due to the independent arrangement of the oil cooler assembly and the after cooler assembly, the cooling between an oil path and an air path will not affect each other, which further ensures the cooling effect of the oil and the compressed air.

In addition, the oil cooler assembly and the after cooler assembly are independently arranged, to avoid mutual interference between the two cooling assemblies and affect the cooling effect. The design of the air inlet and outlet on the outer cover allows the air to flow along a side-in top-out direction or a side-in side-out (where "side" in the "side-out" means an upper part of the side wall) direction, so that the heat due to the operation of the oil injected air compressor can be discharged, which can greatly improve the heat dissipation effect. And due to the independent arrangement of the oil cooler assembly and the after cooler assembly, which are respectively connected to the controller via sig- nals, the controller can control the oil cooler assembly to operate in the energy-saving state based on the signal that indicates the switching of the air compressor from a heavy loading state to an empty loading state, and control the after cooler assembly to operate in the shutdown state. Since the air compressor does not need to provide compressed air to the outside when it is in the empty loading state, the cooling assemblies can be in the shutdown state or the minimum speed state. In the empty loading state, in order to ensure the normal operation of the air compressor, there is still oil circulating between the compressor assembly and the oil separator tank. Therefore, the oil cooler assemblies need to operate in the energy-saving state to cool the oil. In this way, by using the controller and by controlling the oil cooler assembly to operate in the energy-saving state, and the after cooler assembly to operate in the shutdown state or in the minimum speed state, the normal operation of the air com- pressor can be ensured, as well as the energy consumption can be reduced.

As shown in FIG. 12, a system flowchart of an oil injected air compressor according to embodiments of the present disclosure is illustrated. An oil separator tank 40, an oil cooler assembly 50, an oil filter 880, and a compressor assembly 30 are arranged in an oil flow path P1. The oil separator tank 40, the oil cooler assembly 50, the oil filter 880, and the compressor assembly 30 are connected through an oil cooling pipeline 540, to form a circulating flow path. The oil cooling pipeline 540 is not communicated with the after cooler assembly 60.

The oil flow path P1 can also be provided with an oil fine separator 90, which is used to further separate the oil and the air, and transport the separated oil back to the compressor assembly 30.

In some embodiments of the present disclosure, the oil circulates clockwise along a direction indicated by an arrow on the oil flow path P1. The oil passes through the com- pressor assembly 30 and the oil separator tank 40 in sequence, and then enters the oil cooler assembly 50. The oil cooler assembly 50 cools the oil, the cooled oil passes through the oil filter 880 to filter impurities, and then returns to the compressor assembly 30. In addition, the oil enters the oil separator tank 40 and the oil fine separator 90 in sequence, to be separated into liquid oil and air. The liquid oil enters the compressor assembly 30 for the next cycle, while the air enters an air flow path P2.

The oil flow path P1 can also be provided with a flow regulating valve 870. The controller 70 is connected to the flow regulating valve 870 via signals. The controller 70 can control the opening of the flow regulating valve 870, to regulate the flow rate of the oil in the oil flow path P1 and control the temperature of the oil injected into compressor assembly 30.

The controller 70 can control the speed of the oil cooling fan 520 of the oil cooler assembly 50. When the temperature of oil is greater than the set temperature of oil, the speed of the oil cooling fan 520 is increased, which will improve the heat exchange efficiency of the oil cooling heat exchanger 510. When the temperature of oil is less than or equal to the set temperature of oil, the speed of the oil cooling fan 520 is reduced, which will reduce the heat exchange efficiency of the oil cooling heat exchanger 510.

Reference is made to FIG. 12, an intake filter 830, an intake valve 850, a compressor assembly 30, an oil separator tank 40, an oil fine separator 90, a pressure retaining valve 410, and an after cooler assembly 60 are arranged in the air flow path P2.

The air flows through the intake filter 830 and the intake valve 850 in sequence, and reaches the compressor assembly 30. The compressor assembly 30 compresses the air, and the compressed air then passes through the oil separator tank 40 and the oil fine separator 90 in sequence, to separate the liquid oil and compressed air. The liquid oil enters the oil flow path P1, and the compressed air then passes through the pressure retaining valve 410 and the after cooler assembly 60 in sequence. The pressure retaining valve 410 is used to retain the pressure of the compressed air. The after cooler assembly 60 is used to cool the compressed air, and the compressed air cooled by the after cooler assembly 60 is discharged from the oil injected air compressor.

The air flow path P2 can also be provided with a release valve 860, which is used to release the air in the air flow path P2.

The controller 70 can control the speed of the post cooling fan 620 of the after cooler assembly 60. When the tempera- ture of compressed air is greater than the set temperature, the speed of the post cooling fan 620 is increased, which will improve the heat exchange efficiency of the post cooling heat exchanger 610. When the temperature of compressed air is less than or equal to the set temperature, the speed of the post cooling fan 620 is reduced or the post cooling fan 620 is shut down, which will reduce the heat exchange efficiency of the post cooling heat exchanger 610.

The oil injected air compressor further includes a pressure sensor 891 and a temperature sensor 892. The controller 70 is connected to the pressure sensor 891 and the temperature sensor 892 respectively via signals, and is configured to receive air pressure signals and ambient temperature signals.

In some embodiments, the pressure sensor 891 can be arranged between the oil separator tank 40 or the pressure retaining valve 410 and the after cooler assembly 60, and is used to monitor the pressure of the compressed air. The temperature sensor 892 is used to monitor ambient tempera- ture.

Reference is made to FIG. 12, the oil injected air com- pressor provided in embodiments of the present disclosure further includes an oil temperature sensor 330 and a com- pressed air temperature sensor 640. The oil temperature sensor 330 is arranged at an exhaust port of the compressor assembly 30, to monitor the temperature of oil. The com- pressed air temperature sensor 640 is arranged between the after cooler assembly 60 and an exhaust port of the oil injected air compressor system, to monitor the temperature of compressed air. It can be understood that based on the temperature value of the compressed air provided to the client, the temperature monitored by the compressed air temperature sensor 640 can serve as the operating basis for the after cooler assembly 60.

Embodiments of the present disclosure also provide a computer-readable storage medium on which a program product capable of implementing the methods described in the above of the specification is stored. In some embodi- ments, various aspects of the present disclosure can also be implemented in the form of a program product, which includes program codes. When the program product is running on a terminal device, the program codes are configured to cause the terminal device to execute the steps described in method embodiments of the specification.

The program product for implementing the above methods according to embodiments of the present disclosure can be a portable compact disk read only memory (CD-ROM) including program codes, and can be run on a terminal device, such as running on a personal computer. However, the program product of the present disclosure is not limited thereto. In the present disclosure, a readable storage medium may be any tangible medium that contains or stores a program, and the program can be used by or in conjunction with an instruction execution system, apparatus, or device.

The program product may be any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of readable storage media include, electrical connections with one or more wires, portable disks, hard disks, random access memory (RAM), read only memory (ROM), erasable programmable read only memory (EPROM or flash), optical fiber, portable compact disk read only memory (CD-ROM), optical storage devices, magnetic storage devices, or any suitable combination of the above.

A computer readable signal medium may include a propagated data signal in a baseband or as part of a carrier wave with readable program codes embodied thereon. Such propagated data signals may take a variety of forms, including but not limited to electromagnetic signals, optical signals, or any suitable combination of the above. A readable signal medium may also be any readable medium other than a readable storage medium that can transmit, propagate, or transport the program used by or in connection with the instruction execution system, apparatus, or device.

Program codes embodied on a readable medium may be transmitted using any suitable medium, including but not limited to wireless, wireline, optical fiber cable, RF, etc., or any suitable combination of the above.

Program codes for carrying out operations of the present disclosure may be written in any combination of one or more programming languages, including object-oriented programming languages, such as Java, C++, etc., as well as conventional procedural programming languages, such as "C" language or similar programming languages. The program codes may be executed entirely on a user's computing device, partly on the user's device, as a stand-alone software package, partly on the user's computing device and partly on a remote computing device, or entirely on the remote computing device or a server. Where the remote computing device is involved, the remote computing device may be connected to the user's computing device over any kind of network, including a local area network (LAN) or a wide area network (WAN), or may be connected to an external computing device (e.g., connected via the Internet with the help of an Internet Service Provider).

Embodiments of the present disclosure also provide an electronic device capable of implementing the above methods.

Those skilled in the art can understand that various aspects of the present disclosure can be implemented as systems, methods, or program products. Therefore, various aspects of the present disclosure can be specifically implemented in the following forms: the complete hardware implementation, the complete software implementation (including firmware, microcode, etc.), or a combination of hardware and software implementations, which can be collectively referred to as "circuit", "module", or "system".

An electronic device 1100 according to embodiments of the present disclosure will be described below with reference to FIG. 13. The electronic device 1100 shown in FIG. 13 is only an example and should not impose any limitations on the functionality and scope of use of the embodiments of the present disclosure.

Figure 13:
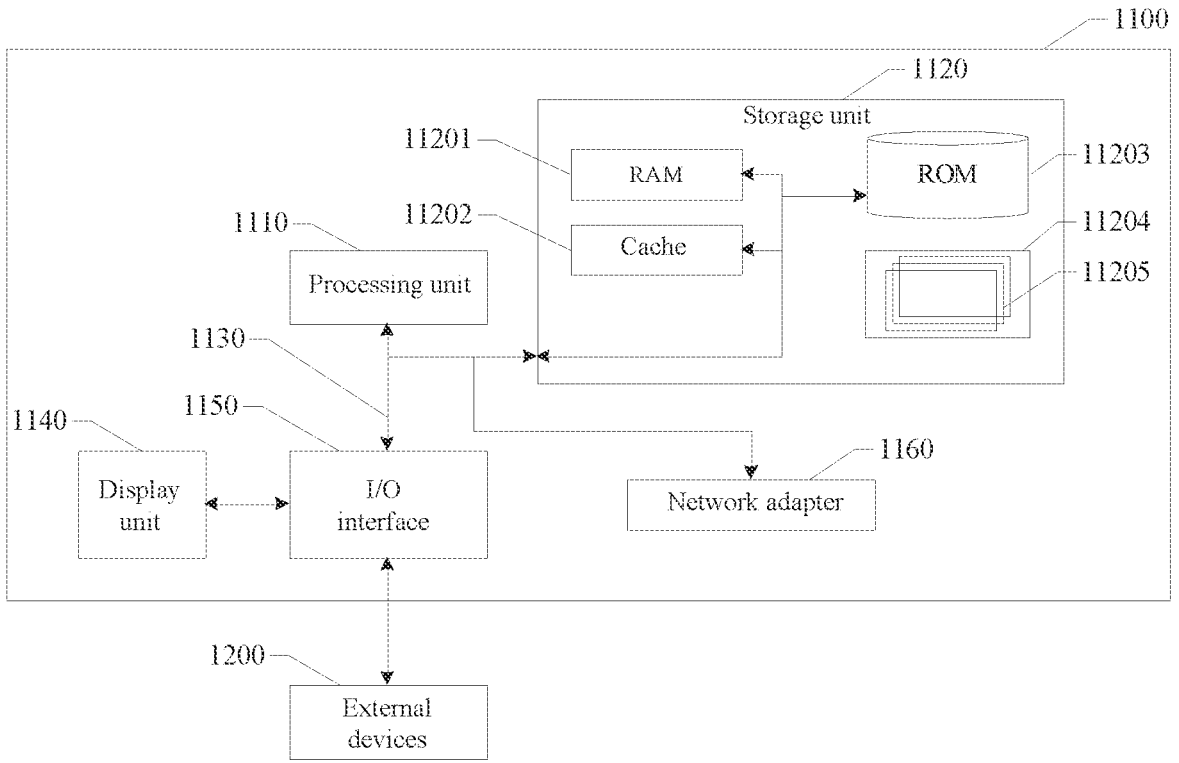
FIG. 13 illustrates a block diagram of an electronic device according to embodiments of the present disclosure.

As shown in FIG. 13, the electronic device 1100 is represented in the form of a universal computing device. The components of electronic device 1100 may include but are not limited to at least one processing unit 1110, at least one storage unit 1120, a bus 1130 connecting different system components (including storage unit 1120 and processing unit 1110), and a display unit 1140.

In some embodiments, the storage unit 1120 stores program codes, which can be executed by the processing unit 1110, causing the processing unit 1110 to execute steps described in the methods according to various embodiments of the present disclosure.

The storage unit 1120 may include a readable medium in the form of a volatile storage unit, such as a random access storage unit (RAM) 11201 and/or a cache storage unit 11202, and may further include a read-only storage unit (ROM) 11203.

The storage unit 1120 may further include a program/utility tool 11204 with a (at least one) set of program modules 11205, such as but not limited to an operating system, one or more application programs, other program modules, and program data, each or some combination of which may include an implementation of a network environment.

The bus 1130 can represent one or more types of bus structures, including storage unit buses or storage unit controllers, peripheral buses, graphics acceleration ports, processing units, or local area buses using any of various bus structures.

The electronic device 1100 can also communicate with one or more external devices 1170 (such as a keyboard, a pointing device, a Bluetooth device, etc.), and can also communicate with one or more devices that enable users to interact with electronic device 1100, and/or with any device that enables electronic device 1100 to communicate with one or more other computing devices (such as a router, a modem, etc.). The communication can be carried out through an input/output (I/O) interface 1150. Moreover, electronic device 1100 can also communicate with one or more networks (such as a local area network (LAN), a wide area network (WAN), and/or a public network, such as the Internet) through a network adapter 1160. As shown in the figure, the network adapter 1160 communicates with other modules of electronic device 1100 through the bus 1130. It should be understood that although not shown in the figure, other hardware and/or software modules can be used in conjunction with electronic device 1100, including but not limited to microcodes, device drivers, redundant processing units, external disk drive arrays, RAID systems, tape drives, and data backup storage systems.

According to descriptions of above method embodiments, it is easy for those skilled in the art to understand that the exemplary method embodiments described herein can be implemented through software or through combination of software and necessary hardware. Therefore, the technical solutions according to embodiments of the present disclosure can be embodied in the form of a software product, which can be stored on a non-volatile storage medium (such as CD-ROM, USB drive, mobile hard drive, etc.) or on a network, including several instructions to enable a computing device (such as a personal computer, a server, a terminal device, or a network device, etc.) to execute the methods according to embodiments of the present disclosure.

It can be understood that the various embodiments provided by the present disclosure can be combined with each other without contradiction, which will not be elaborated here.

In some embodiments of the present disclosure, the terms "first," "second," and "third" are only used for descriptive purposes and cannot be understood as indicating or implying relative importance. The term "multiple" refers to two or more, unless otherwise specified. The terms such as "installation", "connected", "connection", "fixation", etc. should be broadly understood. For example, "connection" can be a fixed connection, a detachable connection, or an integrated connection. The term "connected" can be directly connected or indirectly connected through intermediate media. For those of ordinary skill in the art, the specific meanings of the above terms in the embodiments of the present disclosure can be understood based on specific situations.

In some embodiments of the present disclosure, it should be understood that the terms "up", "down", "left", "right", "front", "back", etc. indicate that the orientation or position relationship based on the orientation or position relationship shown in the drawings, and are only for the convenience of describing the embodiments of the present disclosure and simplifying the description, rather than indicating or implying that the device or unit referred to must have a specific direction, be constructed and operated in a specific orientation. Therefore, it cannot be understood as a limitation on embodiments of the present disclosure.

In the description of embodiments of the present disclosure, the terms "one embodiment", "some embodiments", "specific embodiments", etc. refer to specific features, structures, materials, or characteristics described in conjunction with the embodiment or example being included in at least one embodiment or example of the present disclosure. In the specification, the illustrative expressions of the above terms may not necessarily refer to the same embodiments or examples. Moreover, the specific features, structures, materials, or characteristics described can be combined in an appropriate manner in any one or more embodiments or examples.

The above are only embodiments of the present disclosure and are not intended to limit the present disclosure. For those skilled in the art, embodiments of the present disclosure can have various modifications and variations. Any modifications, equivalent substitutions, improvements, etc. made within the spirit and principles of embodiments of the present disclosure shall be included within the protection scope of the present disclosure.

What is claimed is:

1. An oil injected air compressor, comprising:
a compressor assembly configured to compress air;
an oil separator tank connected to the compressor assembly and configured to separate an oil and air mixture provided by the compressor assembly, wherein oil circulates between the compressor assembly and the oil separator tank;
an oil cooler assembly connected to the compressor assembly and the oil separator tank and configured to cool the oil;
an after cooler assembly connected to the oil separator tank and configured to cool compressed air separated from the oil separator tank; and

a controller connected to the compressor assembly, the oil separator tank, the oil cooler assembly, and the after cooler assembly via signals, wherein the controller is configured to control, based on a state switching signal, the oil cooler assembly to operate in an energy-saving state, and the after cooler assembly to operate in a shutdown state or in a minimum speed state;
wherein the state switching signal is configured to indicate switching of the oil injected air compressor from a heavy loading state to an empty loading state.

2. The oil injected air compressor according to claim 1, wherein the oil cooler assembly comprises:
an oil cooling heat exchanger connected to the compressor assembly and the oil separator tank and configured to exchange heat with the oil;
an oil cooling fan arranged on one side of the oil cooling heat exchanger and configured to discharge the heat generated by the oil cooling heat exchanger; and
an oil cooling motor, wherein the oil cooling motor is a variable frequency motor, and the oil cooling motor is connected to the oil cooling fan and configured to drive the oil cooling fan;
wherein the controller is connected to the oil cooling motor via signals, and is configured to control, based on the state switching signal, the oil cooling motor to operate in a low frequency state.

3. The oil injected air compressor according to claim 1, wherein the after cooler assembly comprises:
a post cooling heat exchanger connected to the oil separator tank, and configured to exchange heat with compressed air separated from the oil separator tank;
a post cooling fan arranged on one side of the post cooling heat exchanger and configured to discharge the heat generated by the post cooling heat exchanger; and
a post cooling motor, wherein the post cooling motor is a variable frequency motor or a fixed frequency motor, and the post cooling motor is connected to the post cooling fan and configured to drive the post cooling fan;
wherein the controller is connected to the post cooling motor via signals, and
when the post cooling motor is the fixed frequency motor, the controller is configured to control, based on the state switching signal, the post cooling motor to operate in the shutdown state; and
when the post cooling motor is the variable frequency motor, the controller is configured to control, based on the state switching signal, the post cooling motor to operate in the shutdown state or in the minimum speed state.

4. The oil injected air compressor according to claim 1, wherein the after cooler assembly is arranged above the compressor assembly.

5. The oil injected air compressor according to claim 1, further comprising:
a base; and
an outer cover connected to the base, wherein the compressor assembly, the oil separator tank, the oil cooler assembly, and the after cooler assembly are arranged on the base and covered by the outer cover, the outer cover is provided with a first air inlet, a second air inlet, a first air outlet and a second air outlet, the first air inlet and the first air outlet correspond to a location of the oil cooler assembly, and the second air inlet and the second air outlet correspond to a location of the after cooler assembly;

wherein the first air inlet and the second air inlet are arranged on a side wall of the outer cover, the first air outlet is arranged on a top wall of the outer cover, and the second air outlet is arranged on the side wall or the top wall of the outer cover.

6. The oil injected air compressor according to claim 5, wherein the oil cooler assembly comprises an oil cooling fan, the oil cooling fan is a centrifugal fan, and the oil cooling fan corresponds to the first air inlet and the first air outlet.

7. The oil injected air compressor according to claim 5, wherein the after cooler assembly comprises a post cooling fan, the post cooling fan is an axial flow fan, and the post cooling fan corresponds to the second air inlet and the second air outlet.

8. The oil injected air compressor according to claim 1, further comprising:
   a base; and
   an outer cover connected to the base, wherein the compressor assembly, the oil separator tank, the oil cooler assembly, and the after cooler assembly are arranged on the base and covered by the outer cover, and the outer cover comprises a first side wall and a second side wall arranged opposite to each other;
   wherein the oil cooler assembly is arranged on an inner surface of the first side wall, the after cooler assembly is arranged on an inner surface of the second side wall, the compressor assembly is arranged close to the inner surface of the second side wall, and the compressor assembly and the oil cooler assembly are arranged opposite to each other along a direction in which the first side wall and the second side wall are spaced.

9. The oil injected air compressor according to claim 8, wherein the compressor assembly comprises a compressor body and a main motor, and the main motor is connected to the compressor body and configured to drive the compressor body; and
   wherein the main motor is connected to the compressor body along a first direction, the oil cooler assembly extends along a second direction, and the first direction is parallel to the second direction.

10. The oil injected air compressor according to claim 1, further comprising:
    a base; and
    an outer cover connected to the base, wherein the compressor assembly, the oil separator tank, the oil cooler assembly, and the after cooler assembly are arranged on the base and covered by the outer cover, and the outer cover comprises a first side wall and a second side wall arranged opposite to each other, a third side wall and a fourth side wall arranged opposite to each other, and a top wall, and wherein the first side wall and the second side wall are respectively connected to two opposite sides of the base, the third side wall and the fourth side wall are respectively connected to the other two opposite sides of the base, and the top wall is connected to the first side wall, the second side wall, the third side wall, and the fourth side wall;
    wherein the oil cooler assembly and the after cooler assembly are arranged on any two different side walls among the first side wall, the second side wall, the third side wall, the fourth side wall, and the top wall.

11. The oil injected air compressor according to claim 1, wherein the oil cooler assembly is connected to the compressor assembly and the oil separator tank through an oil cooling pipeline, and the oil cooling pipeline is not communicated with the after cooler assembly.

12. A method for controlling the oil injected air compressor according to claim 1, comprising:
    obtaining a state switching signal, wherein the state switching signal is configured to indicate switching of the oil injected air compressor from a heavy loading state to an empty loading state; and
    controlling, based on the state switching signal, an oil cooler assembly to operate in an energy-saving state, and an after cooler assembly to operate in a shutdown state or in a minimum speed state.

13. The method for controlling the oil injected air compressor according to claim 12, wherein controlling, based on the state switching signal, the oil cooler assembly to operate in the energy-saving state, and the after cooler assembly to operate in the shutdown state or in the minimum speed state, comprises:
    obtaining a temperature of oil when the oil injected air compressor is in the empty loading state;
    controlling, based on a ratio of the temperature of oil to a set temperature of oil, an oil cooling motor of the oil cooler assembly to adjust a speed of an oil cooling fan; and
    when a post cooling motor of the after cooler assembly is a variable frequency motor, controlling the post cooling motor to shut down or to operate in the minimum speed state, and
    when the post cooling motor is a fixed frequency motor, controlling the post cooling motor to shut down;
    wherein the set temperature of oil is greater than a dew point temperature.

14. The method for controlling the oil injected air compressor according to claim 12, wherein controlling, based on the state switching signal, the oil cooler assembly to operate in the energy-saving state, and the after cooler assembly to operate in the shutdown state or in the minimum speed state, comprises:
    obtaining a temperature of oil when the oil injected air compressor is in the heavy loading state;
    controlling, based on a ratio of the temperature of oil to a set temperature of oil, an oil in cooling motor of the oil cooler assembly to adjust a speed of an oil cooling fan, wherein the set temperature of oil is greater than a dew point temperature;
    obtaining a temperature of compressed air when the oil injected air compressor is in the heavy loading state; and
    when a post cooling motor of the after cooler assembly is a variable frequency motor, controlling, based on a ratio of the temperature of compressed air to a set temperature of compressed air, the post cooling motor to adjust a speed of a post cooling fan; or
    when the post cooling motor of the after cooler assembly is a fixed frequency motor, controlling, based on the ratio of the temperature of compressed air to the set temperature of compressed air, the post cooling motor to start up or to shut down.

15. The method for controlling the oil injected air compressor according to claim 14, wherein when the post cooling motor of the after cooler assembly is the variable frequency motor, controlling, based on the ratio of the temperature of compressed air to the set temperature of compressed air, the post cooling motor to adjust the speed of the post cooling fan, comprises:
    when the temperature of compressed air is greater than the set temperature of compressed air, increasing the speed of the post cooling fan; and when the temperature of compressed air is less than or equal to the set temperature of compressed air, reducing the speed of the post cooling fan or controlling the post cooling motor to shut down.

16. The method for controlling the oil injected air compressor according to claim 14, wherein when the post cooling motor of the after cooler assembly is the fixed frequency motor, controlling, based on the ratio of the temperature of compressed air to the set temperature of compressed air, the post cooling motor to start up or to shut down, comprises:

when the temperature of compressed air is greater than the set temperature of compressed air, controlling a post cooling fan to start up; and when the temperature of compressed air is less than or equal to the set temperature of compressed air, controlling the post cooling fan to shut down.

17. The method for controlling the oil injected air compressor according to claim 13, wherein controlling, based on the ratio of the temperature of oil to the set temperature of oil, the oil cooling motor of the oil cooler assembly to adjust the speed of the oil cooling fan, comprises:

when the temperature of oil is greater than the set temperature of oil, increasing the speed of the oil cooling fan; and when the temperature of oil is less than or equal to the set temperature of oil, reducing the speed of the oil cooling fan.

18. The method for controlling the oil injected air compressor according to claim 14, wherein controlling, based on the ratio of the temperature of oil to the set temperature of oil, the oil cooling motor of the oil cooler assembly to adjust the speed of the oil cooling fan, comprises:

when the temperature of oil is greater than the set temperature of oil, increasing the speed of the oil cooling fan; and when the temperature of oil is less than or equal to the set temperature of oil, reducing the speed of the oil cooling fan.

19. A non-transitory computer-readable storage medium having a computer program stored thereon, which when executed by a processor, causes the method according to claim 12 to be implemented.

20. An electronic device comprising:

one or more processors; and a storage device for storing one or more programs, wherein when the one or more programs are executed by the one or more processors, the one or more processors are caused to implement the method according to claim 12.

* * * * *